United States Patent
Adam et al.

(10) Patent No.: US 9,081,729 B2
(45) Date of Patent: Jul. 14, 2015

(54) GENERATING FAULT TOLERANT CONNECTIVITY API

(71) Applicant: International Business Machines Corporation, Armonk, NY (US)

(72) Inventors: Fayaz Adam, Miami, FL (US); Jeff J. Li, Parkland, FL (US); Paul Stanley, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/224,985

(22) Filed: Mar. 25, 2014

(65) Prior Publication Data

US 2014/0281708 A1    Sep. 18, 2014

Related U.S. Application Data

(63) Continuation of application No. 13/804,243, filed on Mar. 14, 2013.

(51) Int. Cl.
    G06F 11/00    (2006.01)
    G06F 11/14    (2006.01)

(52) U.S. Cl.
    CPC .................................. *G06F 11/1443* (2013.01)

(58) Field of Classification Search
    CPC .................................................... G06F 11/1443
    USPC ............................................ 714/15, 16, 38.1
    See application file for complete search history.

(56) References Cited

U.S. PATENT DOCUMENTS

| | | | |
|---|---|---|---|
| 5,390,325 A * | 2/1995 | Miller | 714/38.14 |
| 6,421,688 B1 | 7/2002 | Song | |
| 6,714,979 B1 | 3/2004 | Brandt et al. | |
| 6,728,747 B1 | 4/2004 | Jenkins et al. | |
| 6,748,386 B1 | 6/2004 | Li | |
| 7,512,682 B2 | 3/2009 | Aronoff et al. | |
| 7,797,709 B2 | 9/2010 | Handa et al. | |
| 8,250,523 B2 | 8/2012 | Hall et al. | |
| 2004/0181792 A1 * | 9/2004 | Barajas | 718/101 |
| 2007/0198524 A1 | 8/2007 | Branda et al. | |
| 2010/0161967 A1 | 6/2010 | Roegner | |
| 2012/0110652 A1 | 5/2012 | Brown et al. | |

OTHER PUBLICATIONS

U.S. Appl. No. 13/804,243, entitlted "Generating Fault Tolerant Connectivity API", filed Mar. 14, 2013.
28 Transparent Application Failover, retrieved Feb. 12, 2013, <http://docs.oracle.com/cd/B19306_01/java.102/b14355/ocitaf.htm>.
Transparent Application Failover, Oracle Database: JDBC Developer's Guide and Reference, 10g Release 2 (10.02), Mar. 2010, pp. 28-1-28-3, Oracle, Redwood Shores, United States.

* cited by examiner

*Primary Examiner* — Joshua P Lottich
(74) *Attorney, Agent, or Firm* — Patterson & Sheridan, LLP

(57) ABSTRACT

To make a connection between a user application and a data source fault tolerant, a user may use a wrapper generator to create an API wrapper that retries request that may have failed due to a service disruption. Generally, the wrapper manages a cache and contains the necessary information for retrying a connection after a service disruption. To create the wrapper, the wrapper generator may identify the different commands used by the user application to access the data source. The wrapper generator presents these commands to the user who organizes the commands to generate usage patterns for the different requests the user application may send to the data source. The user may also define a caching preference associated the commands in the usage patterns. To restart the connection, the wrapper may use the cache data to generate a new request to complete the original failed request.

7 Claims, 4 Drawing Sheets

GENERATING FAULT TOLERANT CONNECTIVITY API

CROSS-REFERENCE TO RELATED APPLICATION

This application is a continuation of co-pending U.S. patent application Ser. No. 13/804,243, filed Mar. 14, 2013. The aforementioned related patent application is herein incorporated by reference in its entirety.

BACKGROUND

Embodiments of the present invention relate to creating fault-tolerant connectivity between a user application and a data source, and more specifically, to generating a wrapper for an application programming interface (API) to initiate retries after service disruptions.

A user application may access a remote data source to store, retrieve, alter, or delete data in the data source. When executing a particular request, the connection between the user application and the data source may be disrupted. In some cases, the user application may rely on a driver for communicating with the data source. When the service disruption occurs, the driver may abort the request. As a result, the user application may stop functioning or appear hung. The user may attribute the non-functionality of the user application as a bug in the application when in fact the root cause is a service disruption such as a loss of network connectivity, a bug in the driver, the data source is offline, etc. In these scenarios, the connection between the user application and data source is not fault tolerant, and thus, a request from the user application may be lost even in the situation of a minor or temporary service disruption.

SUMMARY

Embodiments of the present disclosure include a method, a system, and a computer program product for generating a wrapper for an application program interface (API). The method, system, and computer program product receive a usage pattern comprising a sequence of commands issued by a user application to access a data source. The method, system, and computer program product receive a cache option associated with at least one command in the usage pattern, the cache option defining how the wrapper, to be generated, caches data when the user application issues the at least one command. The method, system, and computer program product receive an error code associated with the at least one command where the error code represents an error message issued by one of the API and the data source in response to a service disruption and where the wrapper is configured to restart a user application request upon identifying the error code. The method, system, and computer program product generate the wrapper based on the received usage pattern, the received cache option, and the received error code.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
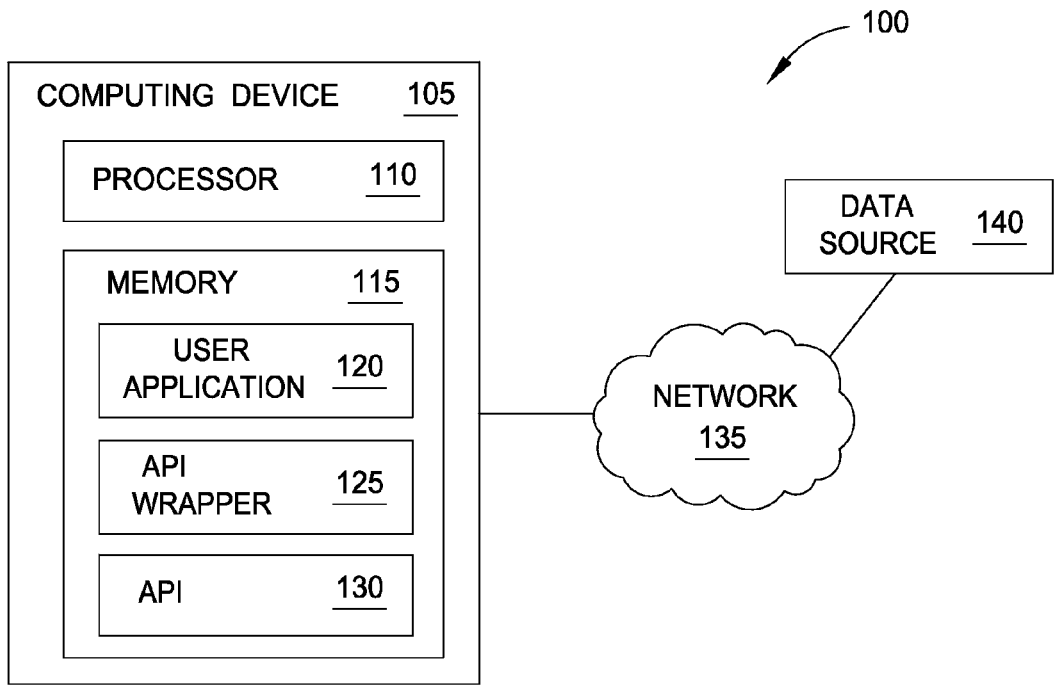
FIG. 1 is a system for establishing a fault tolerant connection to a data source, according to one embodiment of the invention.

User applications may interact with one or more application programming interfaces (API) (e.g., a driver) that enables the user application to access a data source. For example, the user application may send a request for data which the API translates into the particular format used by the data source and forwards to the data source. However, if the data source is temporarily unavailable or the network is down, the API may abort before the request is complete. Many APIs are not configured to handle a disruption in connectivity between a client device and the data source—i.e., many APIs are not fault tolerant. As such, the user application request may fail rather than retrying the connection once the data source becomes available.

In one embodiment, the user application may be programmed to be fault tolerant to service disruptions. But this means that the applications have to understand and react to the specific return messages and error codes used by the data sources. The user application may access a plurality of different data sources that each use a different format to store, search, alter, and retrieve data. To achieve fault tolerance, the user application must be able to process each of the different formats. For example, each database may use different error codes to indicate that connectivity is lost. To restart the connection, the user application would have to understand each of the different errors codes as well as other information about the data source to determine the particular action to take.

Instead of altering the user application, a wrapper generator (e.g., a software tool) may be used to generate a wrapper for the API. The wrapper may be an added layer of logic between the user application and the API. Generally, the wrapper manages a cache and contains the necessary information for restarting a connection after a service disruption. To create the wrapper, the wrapper generator may identify the different commands used by the user application to access the data source and provide a list of these commands to the user. The user may organize the commands to generate usage patterns for the different requests the user applications sends to the data source. For example, the user may define a usage pattern for querying the data source, inserting data into the data source, deleting data from the data source, and the like.

For each command in a usage pattern, the user may define one or more caching options or preferences associated with the command. In one embodiment, the caching options instruct the wrapper how to cache data when the user application issues commands. To restart the connection, the wrapper may use the cached data to generate a new request to complete the failed request. Stated differently, the cached data provide a context which describes the state of the connection between the user application and the data source. The wrapper can use the context to restart the connection.

The wrapper generator may also associate one or more error codes with the commands in a usage pattern. The wrapper generator may configure the wrapper such that when the error code is received from the API, the wrapper restarts the connection based on the cached context. In one embodiment, the error codes that trigger the wrapper to restart the connection may vary based on which command is currently being executed. For example, if the wrapper receives a time-out error when executing a getData command, the wrapper may attempt to restart the connection. But if the same error code is received when executing the disconnect command, the wrapper may ignore the error code.

Once the wrapper generator receives from the user the various cache and error code options associated with the commands in the usage patterns, the generator may create the wrapper, which, when executed, creates a fault tolerant connection between the user application and the data source. In one embodiment, the wrapper generator is a generic tool that may be used to generate a wrapper for any API. That is, if a user application communicates with multiple data sources that use respective APIs, the wrapper generator may generate a customized wrapper for each of the APIs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the wrapper generator) or related data available in the cloud. For example, the wrapper generator could execute on a computing system in the cloud and generator customized wrappers based on the user's input. In such a case, the wrapper generator could generate the wrappers and store the wrappers at a storage location in the cloud for later retrieval by the user. Doing so allows a user to access this information from any computing system attached to a network connected to the cloud (e.g., the Internet).

FIG. 1 is a system 100 for establishing a fault tolerant connection to a data source 140, according to one embodiment of the invention. System 100 includes a computing device 105, a network 135, and the data source 140. As shown, computing device 105 includes a processor 110 and a memory 115. Processor 110 may represent one or more processor units capable of performing the functions described herein. The processor units may be either single or multi-core processors. Memory 115 may include any number or combination of memory units. For example, memory 115 may include volatile or non-volatile memory units such a DRAM, SRAM, Flash, hard disk drives, and the like. Moreover, memory 115 may include memory units that are external to computing device 105 but are nonetheless communicatively coupled to processor 110.

Memory 115 includes a user application 120, API wrapper 125, and API 130. The user application 120 may be any application that accesses data in a data source. Non-limiting examples of possible user applications 120 include extract, transform, and load (ETL) applications, cloud-interface tools, database query applications, server query tools, and the like. In one embodiment, user application 120 may be any application that accesses a remote data storage device or system to retrieve, search, alter, or store data. API wrapper 125 may serve as a communication layer between the user application 120 and the data source 140. In one embodiment, API wrapper 125 adds fault tolerance to the connection between user application 120 and data source 140 by enabling a request to restart after a service disruption.

API 130 may also be part of the connection between the user application 120 and the data source 140. In one embodiment, API 130 is a driver that translates requests from user application 120 into a format understandable to data source 140. API 130 may be provided by a vendor who sells the data source 140. As shown here, API wrapper 125 and API 130 are located client side—i.e., on the computing device 105 hosting the user application 120—but this is not a requirement. For example, either of these elements may be located on a different computing device (or devices) from computing device 105 and still perform the functions described herein.

Network 135 may be local access network, a wide access network, or some combination of both. For example, the connection between computing device 105 and data source 140 may traverse both an intranet portion of the network 135 as well as a public portion (e.g., the Internet) of the network 135. Moreover, in one embodiment, computing device 105 may have a direct connection to data source 140 in which case network 135 may be omitted from system 100.

Data source 140 may be a data storage device or system that permits the user application 120 to remotely alter the data stored therein. For example, data source 140 may be a database, an enterprise resource planning (ERP) system, cloud storage network, and the like. In one embodiment, data source 140 may be a standalone computing device (e.g., a server) or a plurality of interconnected computing devices (e.g., interconnected blade servers). Using network 135, user application 120 may access data source 140 to retrieve, search, alter, or store data.

Figure 2:
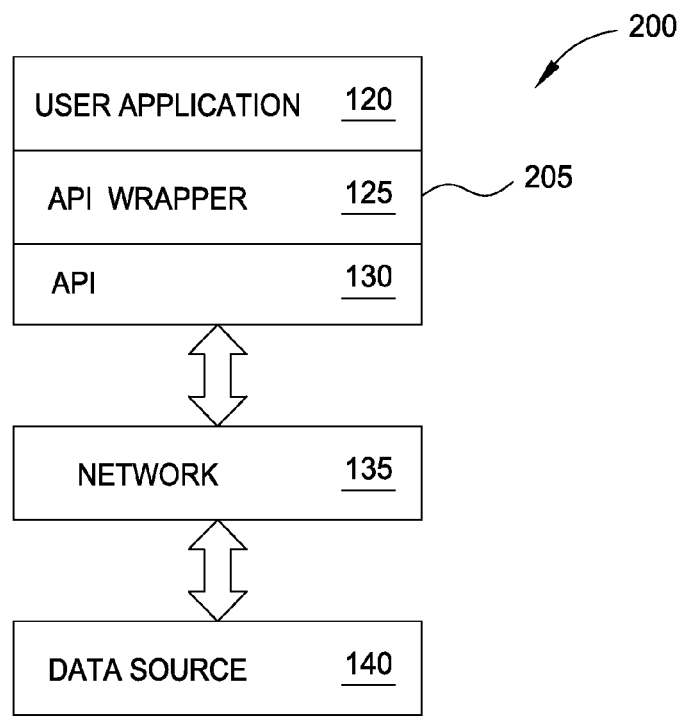
FIG. 2 is a data flow with a fault tolerant connection to a data source, according to one embodiment of the invention.

FIG. 2 is a data flow 200 with a fault tolerant connection to the data source 140, according to one embodiment of the invention. Specifically, data flow 200 includes a stack 205 that is used by user application 120 and data source 140 to communicate. As shown, API wrapper 125 is placed in the stack 205 between user application 120 and API 130. In one embodiment, as user application 120 and data source 140 communicate, the data flows through API wrapper 125. Although the function of API wrapper 125 is discussed in greater detail below with regards to FIG. 5, generally, API wrapper 125 may detect a service disruption based on error codes that are generated either by API 130 or data source 140. These error codes may indicate, for example, that the database is temporary unavailable or that no module in the data source 140 is available to execute a request from the user application 120. Using the received error codes, API wrapper 125 may select a particular action to perform. In one embodiment, the wrapper 125 may restart the request based on a context stored in the cache. In this manner, the wrapper 125 is able to generate fault tolerant connectivity between the user application 120 and the data source 140 without having to modify the user application 120 or the API 130.

In the absence of a service disruption, the API wrapper 125 may simply forward the information between the user application 120 and the API 130—i.e., wrapper 125 is transparent. That is, if the information received from API 130 does not include an error code, API wrapper 125 may forward the communication unchanged to user application 120. However, in one embodiment, API wrapper 125 may attempt to retry a request if the communication includes an error code. Further still, API wrapper 125 may only retry the request based on receiving certain error codes—i.e., some error codes may be ignored. As such, API wrapper 125 may include logic for monitoring the communications issued by API 130 to determine if the communications include an error code that requires wrapper 125 to perform a corresponding action—e.g., restart the request because of service disruption. For example, if API 130 is never able to connect to data source 140, API 130 may transmit a time-out error code to API wrapper 125. Instead of the user application 120 having to be able to interpret error codes for all the different data source with which it communicates, API wrapper 125 interprets the error code and determines if attempting to reconnect to the data source 140 is appropriate.

Figure 3:
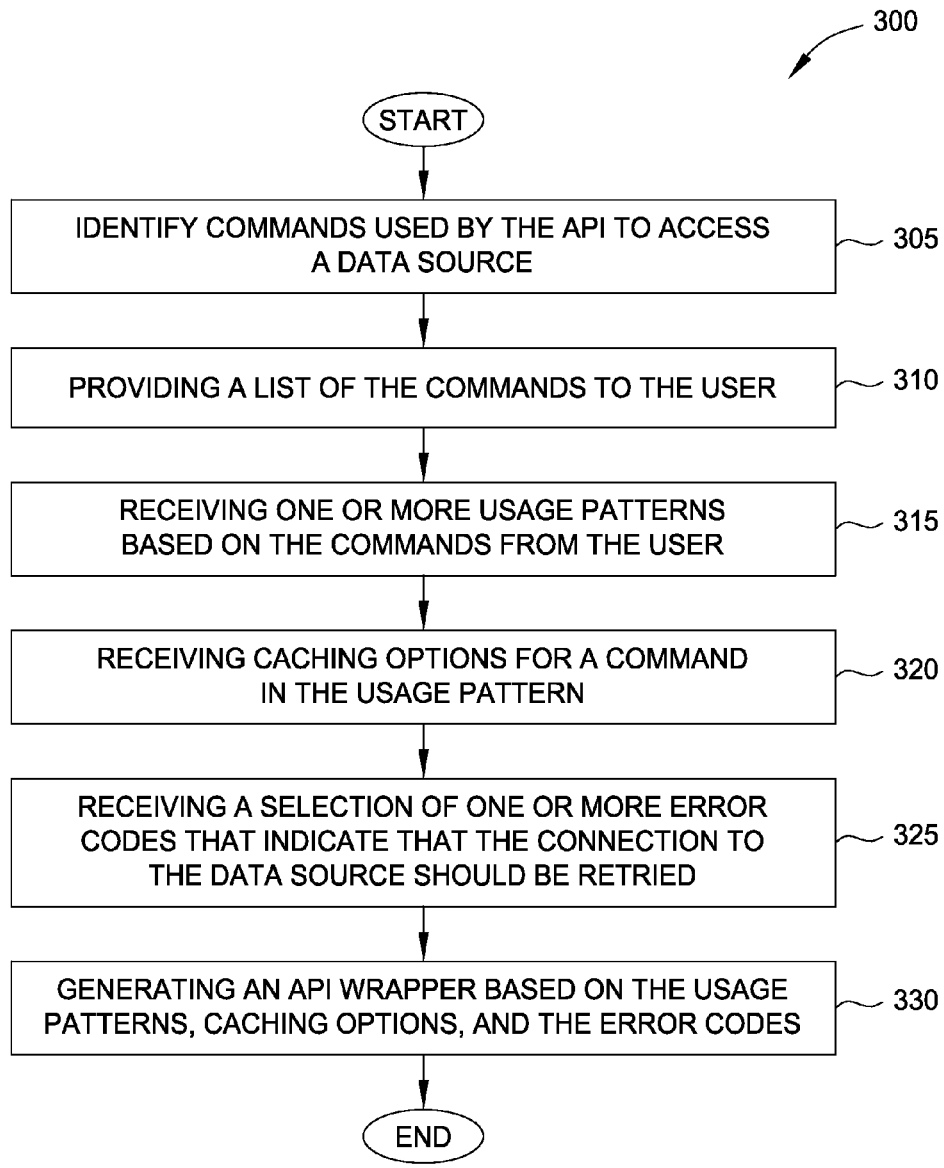
FIG. 3 is a method for generating an API wrapper used in a fault tolerant connection to a data source, according to one embodiment of the invention.
Figure 4:
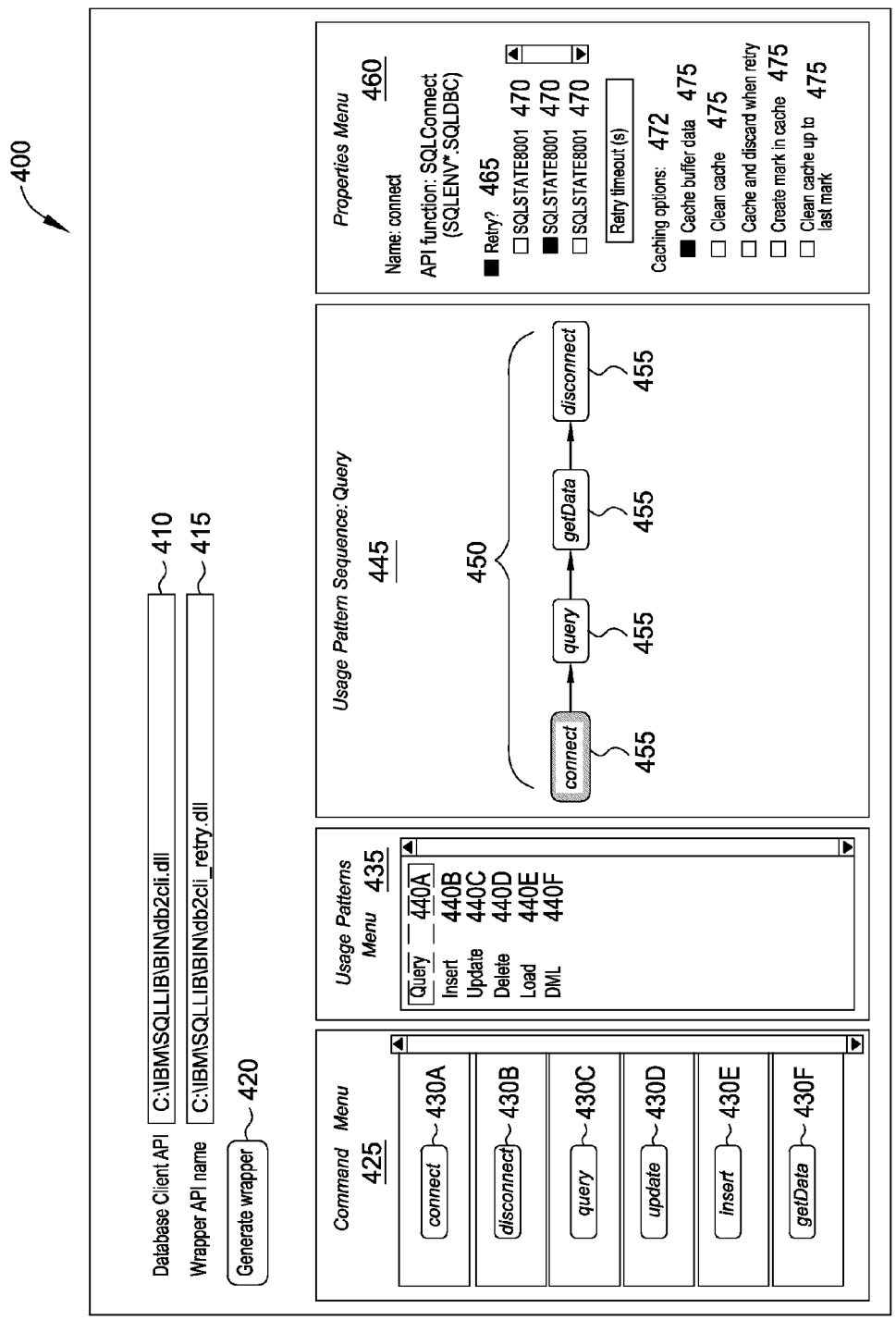
FIG. 4 is graphical user interface for generating the API wrapper, according to embodiments of the invention.

FIG. 3 is a method 300 for generating an API wrapper used in a fault tolerant connection to a data source, according to one embodiment of the invention. In one embodiment, method 300 is used by a wrapper generator to generate a customized API wrapper based on a particular database format or schema. To better explain method 300, FIG. 3 is described in parallel with FIG. 4 which is graphical user interface (GUI) which may be used by the wrapper generator to receive input from the user to configure and generate the API wrapper. Although FIG. 4 is a GUI, other types of interfaces for generating the API wrappers are specifically contemplated. For example, a user may generate a XML file that describes the usage patterns, cache behavior, and retry conditions corresponding to the commands in a data source's schema. Using the XML file as an input, the wrapper generator (e.g., a command utility) may generate the corresponding API wrapper. If the user desires an API wrapper for a different data source, the user may generate a different XML file which the wrapper generator uses to generate another customized API wrapper. Accordingly, method 300 is not limited to a particular type of wrapper generator or interface but may be implemented by a plurality of different generators that may have different user interfaces. Further still, method 300 is described as receiving inputs from a user to generate the API wrapper. However, in other embodiments, the wrapper generator may monitor the user application or other information source to generate an API wrapper as described herein without receiving input from the user.

GUI 400 of FIG. 4 may be an interface used by a wrapper generator to provide information and receive instructions from a user who wishes to generate an API wrapper for a data source. The various options, menus, buttons, scroll bars and their arrangement are for illustratively purpose only. One of ordinary skill in the art will recognize the various ways in which the features of GUI 400 may be altered or rearranged.

GUI 400 may include a source input line 410 where the user provides the location of the API in a computer device. In GUI 400, the API is a database driver with a dynamic-link library extension. Using line 415, the user may instruct the wrapper generator where to store the generated API wrapper and its name. Once the user has provided has provided usage patterns, cache properties, and retry options to the wrapper generator (which are discussed in detail below), the user may use button 420 to generate the wrapper. In one embodiment, the wrapper generator receives the user's input and generates and compiles code to create a file (e.g., a dynamic-link library extension) at the location in the compute device specified at line 415.

At block 305 of method 300, the wrapper generator, which may be loaded and executed on computing device 105 of FIG. 1 using processor 110, may identify commands used by the API to access a data source. In one embodiment, the API is a data source driver that is provided by the vendor of the data source. Using the driver, the user application is able to send requests to store, retrieve, alter, or search data in the data source. In some scenarios, a user application may send requests to a plurality of data sources, and thus, may use respective drivers for each of the data sources. Moreover, because the APIs may be provided to the user by the data source vendor, in one embodiment, the user may be unable to evaluate or change the source code of the APIs. Thus, the user may be unable to directly alter the APIs to make the connection between the user application and the data source fault intolerant.

At block 310 of method 300, the wrapper generator provides a list of the commands used by the user application when accessing the data source to the user. As shown by GUI 400, the wrapper generator may display a list of the commands in the command menu 425. The number of commands, as well as the type of commands, may differ depending on the user application or API. To generate the list of commands, the wrapper generator may send a request to the user application to provide the various commands that are used by the application when accessing the data source. Alternatively, the wrapper generator may receive the commands directly from the user or the generator may retrieve the list from the API. The command menu 425 illustrates only one example a list of commands corresponding to a particular user application. Menu 425 may change depending on the functionality of the user applications.

Each command may be individually represented by an icon 430. In one embodiment, the icons 430A-F may be interactive such that the user can drag and drop the icons 430A-F into other locations within GUI 400. As discussed below, the icons may be moved in order to generate usage patterns for a particular request.

At block 315 of method 300, the wrapper generator may receive usage patterns based on the commands. In one embodiment, a usage pattern is a sequence of commands that the user application transmits to the API for accessing the data source. As used herein, a usage pattern is also referred to as a "user application request" or just a "request". The API may take the sequence of commands and translate the individual commands into a format used by the data source.

The usage pattern sequence section 445 of GUI 400 represents an example usage command for querying a data source. As shown, the query usage pattern 450 includes a plurality of commands 455 that, when translated and passed on to the data source, retrieve specified data from the database. In one embodiment, the user application may use the same usage patterns when accessing different data sources. For example, when querying a database and a cloud-storage system, the user application may use the same query usage pattern 450. To provide the wrapper generator with the usage patterns, in one embodiment, the user may drag and drop the icons 430A-F in a particular order into the usage pattern sequence section 445. The wrapper generator may then connect the commands 455 to generate the usage pattern 450.

GUI 400 may allow the user to define a usage pattern for each different request the user application may issue to the data source. For example, GUI 400 includes a usage pattern menu 435 that lists six different usage pattern types 440A-F (or requests) associated with the user application. In one embodiment, the wrapper generator may automatically populate the list of possible usage pattern types 440 by communicating with the user application. Alternatively, the user may use GUI 400 to manually define the different usage pattern types 440 implemented by the user application. As shown in by the dotted lines, the query usage pattern 440A is currently selected for display in the usage pattern sequence section 445. Accordingly, if the user desires to amend the usage pattern for the other usage pattern types 440B-F, the user may click on the respective type 440 in the usage pattern menu 435 which changes the usage pattern sequence section 445 to the desired usage pattern. The user is then free to generate, alter, or delete the usage pattern. For example, the usage pattern for the insert usage pattern may include a connect command, followed by an insert command, a putData command, an end transaction (e.g., commit) command, and a disconnect command. As mentioned previously, the same usage patterns may apply to multiple different types of data sources or the user application may use different usage patterns when accessing data in different data sources.

In one embodiment, the wrapper generator may use the usage patterns to configure a state machine within the API wrapper. As a user application issues commands, the commands may change the current state of the state machine. For example, the connect command may be used by a plurality of different usage patterns, but as additional commands are issued from the user application, the API wrapper can determine which usage pattern the user application is performing (e.g., a query, insert, delete, etc.). In this manner, the state machine enables the wrapper to identify the usage pattern and then customize its response based on this knowledge. As will be discussed below, the API wrapper may perform different caching options or use different criteria to evaluate received error codes based on the different usage patterns and commands within those patterns.

At block 320 of method 300, the wrapper generator may receive caching options for one of the commands in a usage pattern. The caching options may set a context for each of the commands. Stated differently, the caching options define what commands and/or data should be resent to the data source in order to restore the execution context if the wrapper detects a service disruption. For example, assume the user application has requested that the API perform a query to the data source. As shown in FIG. 4, the user application sends a connect command followed by a query command, getData command, and a disconnect command to the API. However, the context changes as each of these commands is performed. Accordingly, the user may set different caching options as each command is executed. For example, when performing a connect command, the user may set the caching options to cache buffer data. This instructs the wrapper to buffer the data received while the system performs the connect command. If the connectivity fails during this command, the cache could be used to restart the connection at the point of failure. However, the user may set a different caching option for the getData command—e.g., the wrapper may cache the properties of the command (e.g., what data the user application requested from the data source) but discard data that was received by the user application before the connection was lost. Further, if the connection was severed when performing the disconnect feature, the user may set the caching options to clean the cache. The wrapper may combine the cache data retrieved during the different commands in a usage pattern in order to recreate the request in response to a service disruption. A more detailed discussion on the differences between the caching options may found in the description accompanying FIG. 5.

GUI 400 includes a properties menu 460 for assigning the caching options 475 for the various commands in a usage pattern. For example, a user may select a particular command 455 in the usage pattern sequence menu 445 to bring up the properties menu 460 corresponding to the selected command 455. Here, properties menu 460 corresponds to the "connect command" in section 445 which is shown as being shaded. Caching option section 472 includes a list of different caching options 475 which the user may select from. In one embodiment, the user may select only one caching option for a command 455 in the usage pattern. However, in other embodiment, the user may select a plurality of caching options for a selected command. By selecting each command 455 individually, the user may set the caching option (or options) 475 for each command 455. The user could then use menu 435 to display a different usage pattern in section 445 which enables the user to select those commands in order to set the caching options 475. In this manner, GUI 400 permits a user to set the caching options for the different commands in the various usage patterns.

At block 325 of method 300, the wrapper generator may receive a selection of one or more error codes that indicate that the connection to the data source should be retried. The error codes may vary between the different database formats. That is, the structure, format, or types of error codes may differ according to the data source schema. In one embodiment, the wrapper generator permits the user to select which of the error codes are relevant—e.g., the user may want the wrapper to perform an action such as retrying the request when only some error codes are received while other error codes are ignored. Further still, the user may define which action should be performed based on the error code received. Although the present embodiments describe restarting or retrying the connection based on the error codes, other actions are specifically contemplated, such as notifying the user application of the particular error, requesting instructions from a user, requesting additional information from the data source (e.g., a time estimate when an upgrade may complete), severing the connection between the user application and the data source without attempting to retry, and the like.

In one embodiment, the wrapper generator may retrieve a list of possible error codes from the API identified at line 410 of GUI 400. That is, much like with the commands displayed in the command menu 425, the generator may request that the API transmit all the error codes 470 the API may generate which are then displayed in the properties menu 460. In another embodiment, the wrapper generator may be preconfigured to contain the different error codes that various database formats may generate. In these examples, the wrapper generator may identify the type of the API and load the corresponding error codes 470 into the properties menu 460. In another embodiment, the user or the data source may provide error codes 470 to the wrapper generator which are then displayed in the properties menu 460.

In GUI 400, the user may select one or more of the error codes that correspond to the particular selected command in the usage pattern 450. Based on the configuration shown in FIG. 4 for the "connect command", the resulting wrapper will attempt to retry the connection between the user application and the data source if the wrapper receives a SQLSTATE8004 error code 470 while the connect command is being executed by the data source. Although using one error code to trigger the retry is shown, in other examples, the user may configure the wrapper to restart (or perform a different action) based on receiving any one of a plurality of error codes 470. Furthermore, the user may select one or more error codes that will trigger the wrapper to perform a retry attempt (or any other action) for each command 455 in the usage pattern 445. The user may continue this process for each usage pattern type 440 displayed in menu 435. Of course, if desired, the user may not select an error code for all the commands 455 in a usage pattern 450. For example, if the connection is lost while executing the "disconnect" command, the user may not want the wrapper to attempt to restart the connection when receiving an error code 470.

In one embodiment, GUI 400 may include a timer configurable by the user which provides an amount of time the wrapper should wait before attempting to restart a connection. When receiving an error code that matches a user-defined error code, the wrapper may wait for the time defined by the timer before restarting the connection. Furthermore, the user may also set the number of attempts the wrapper should make to restart the connection. These attempts may be spaced apart using the timer (e.g., the wrapper waits ten seconds between each attempt to restart the connection) or the wrapper may wait progressively longer (or shorter) periods before issuing a new request as the previous attempt fails.

At block 330, the wrapper generator may generate an API wrapper for the API designated by the user based on the usage patterns, caching options, and the error codes identified in blocks 315-325. That is, the wrapper generator is itself an application that then uses the user-provided settings to generate code or an executable embodied by the API wrapper. By changing the user-defined setting, the wrapper generator may be configured to create an API wrapper for any type of API. Once deployed, the API wrapper monitors the data flow between the data source and the user application to generate a fault tolerant connection. More specifically, the wrapper generator may configure the API wrapper to perform a selected action when detecting one or more corresponding error codes. Using GUI 400 as an example, the wrapper generator configures the API wrapper such that when the wrapper receives a SQLSTATE8004 error code while executing the connect command of a query, the API retries the connection—e.g., restarts the query.

Figure 5:
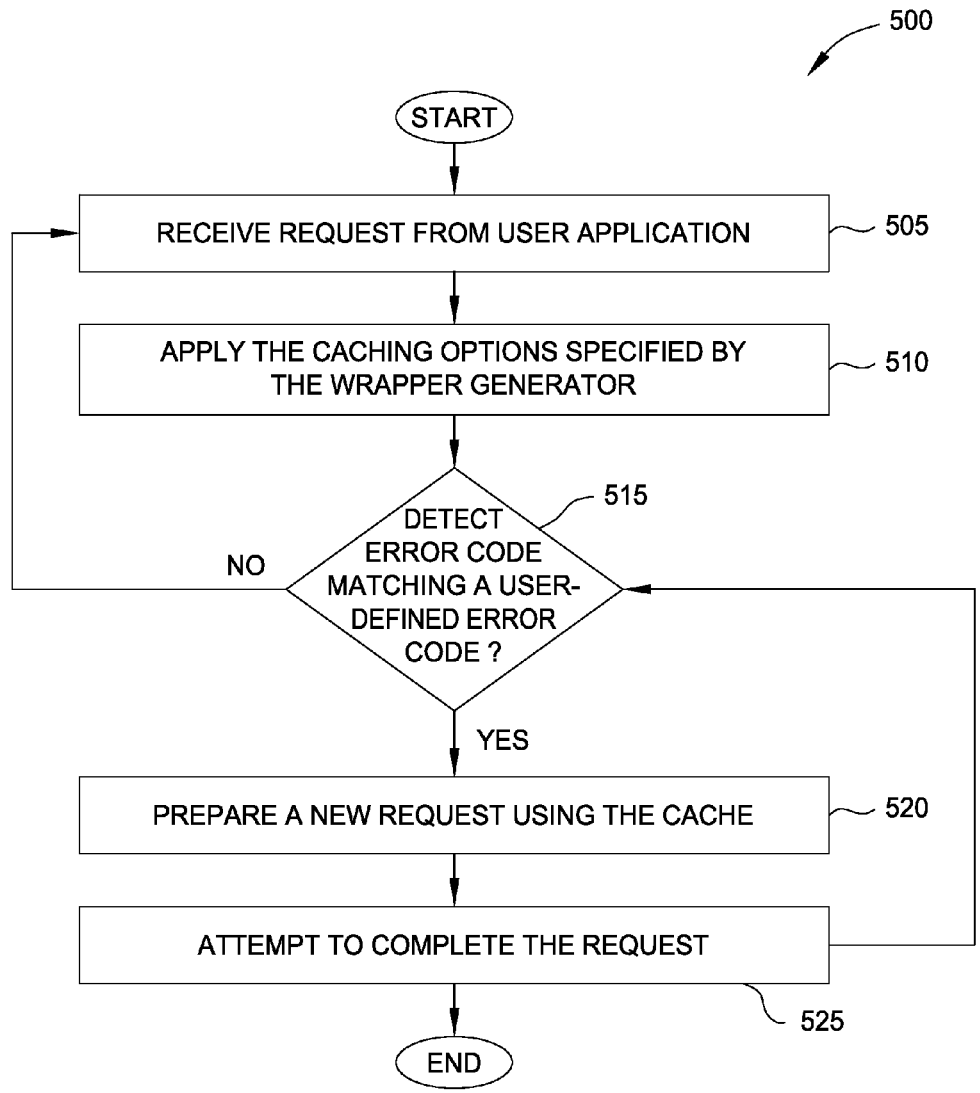
FIG. 5 is a method for using an API wrapper to create a fault tolerant connection to a data source, according to one embodiment of the invention.

FIG. 5 is a method 500 for using an API wrapper to create a fault tolerant connection to a data source. In one embodiment, method 500 may be performed after method 300 of FIG. 3 is used to generate an API wrapper based on user-provided settings. The API wrapper may then be deployed as a wrapper for the API used by one or more user applications to access a data source. As mentioned earlier, the API wrapper may be hosted on the same computing system that hosts the user application and/or the API or be located remotely.

At block 505, the API wrapper receives a request from a user application. In one embodiment, the request is intended to access data in a data source. For example, the request may include one or more commands for storing, retrieving, or manipulating data in the data source. In one embodiment, the request may include a plurality of commands (e.g., connect, query, update, insert, getData, etc.) related to accessing the data in the data source. As discussed previously, the commands may be arranged in a particular manner (i.e., a usage pattern) to perform a corresponding task such as insert data, retrieve data, delete data, and the like. The user application may either send the commands all at once or may send a new command after the previous command in the request was successfully executed by the data source. In one embodiment, the API wrapper may monitor the commands to progress through a state machine configured based on the usage patterns provided to the wrapper generator.

At block 510, the API wrapper may apply the caching option specified by the wrapper generator when the wrapper was created. After receiving a request, the API wrapper may match the request to one of the user-defined usage patterns using, for example, the state machine. As shown in GUI 400 of FIG. 4, the commands 455 in the usage pattern 450 may specify a particular caching option 470. Accordingly, upon identifying which usage pattern a command is associated with, the API wrapper applies the corresponding caching option.

For example, when performing the connect command during a query, the API wrapper may cache buffer data. The cached data may include the information transmitted by the user application to the data source such as the data source's ID, the user application's ID, a login, etc. Generally, the API wrapper may cache the data required in order to resubmit the same command if the connection between the user application and the data source is lost.

As each command in the usage pattern is completed and the user application transmits a new command to the API, the API wrapper may apply the cache option or options for the new command. For example, the cache option when performing the connect command for a query may be different than the cache option when performing the getData command of the query. In some queries, the user application may transmit a plurality of sequential getData commands if, for example, the requested data exceeds the amount of data that can be transmitted in response to one getData command. The API wrapper may cache the properties of each getData command (e.g., the location of the data that was requested) as well as whether the getData command was successfully completed. If a particular query uses ten getData commands but only half of these commands are completed before the connection is lost, the wrapper may restart the connection using the cached information regarding the first five getData commands. However, in one embodiment, the API wrapper may not cache the actual data received from the data source in response to a getData command. The wrapper may then add this cached data to the data cached in the previous commands of the request. Thus, if the connectivity is lost, the wrapper can attempt to retry the same query at a later time.

When performing a putData command associated with an insert, in addition to caching information regarding the properties of the command, the API wrapper may also cache the data to be stored in the data source. For example, the user application may use a putData command to store a column of data in a particular table in the data source. The API wrapper may cache both the location this data is to be stored as well as the data itself. Thus, if the connection fails before the insert has been committed, the API wrapper can restart the connection and retransmit the same data to the data source. By applying cache options, the API wrapper is invisible to the user application and does not need to rely on the user application to, for example, retransmit commands after the connection is lost.

After evaluating the commands received from the user application to determine which cache option to apply, the API wrapper may pass the command to the API which translates the command into a format understandable to the data source's schema. The API may then transmit the translated command to the data source which then performs the command such as storing data into the data source, transmitted requested data to the API, manipulating data already stored in the data source, and the like.

At block 515, the API wrapper determines whether a received error code matches a user-defined error code. In one embodiment, the API may abort the user application request and transmit an error code to the user application because of, for example, hardware or network failures, an issue with the data source, or any other service disruption. Because the API wrapper may be a communication layer between the API and the user application, the wrapper may evaluate each error code and determine if the error code matches one that the user previously selected when configuring the API wrapper using the wrapper generator. Stated differently, the user may only be concerned with certain error codes while other error codes may be ignored. By using the wrapper generator, the user can create an API wrapper that selects which error codes should considered and which should be ignored. Although method 500 describes receiving error codes generated by the API, in other embodiments, the error codes may originate from the data source. For example, the data source may issue an error code when the data source is currently being upgraded or is too busy to service the request. The API may forward the error code to the API wrapper to determine if the request should be retried.

In one embodiment, the wrapper may also determine whether the received error code corresponds to the current command issued by the user application. When generating the API wrapper, the user may configure the wrapper such that the list of relevant error codes may change based on the particular command issued by the user application or the type of request. For example, the error code that is relevant when the user application issues the query command may not be relevant when the user application issues the disconnect command. Furthermore, the user may select different relevant codes for the same command that is used in a different usage pattern or request—e.g., the connect command in a query usage pattern may have a different relevant error code than the disconnect command in a delete usage pattern. In one embodiment, the API wrapper may use a state machine to determine the current usage patter, and thus, what error codes are irrelevant and what error codes are irrelevant.

If a received error code does not match a user-defined error code, method 500 may return to block 505 to wait for a different request (or command) from the user application. If, however, the received error code matches a user-defined error code, at block 520, the API wrapper may prepare a new request based on the cache. Because the API wrapper uses the cache option to cache data based on the commands received from the user application, if an error code is received, the cached data is used to generate a new request. Assume the connection between the user application and the data source is lost during a query and only half of the getData commands associated with the query have been performed. Using the cached data, the API wrapper may recreate the query. Specifically, the API wrapper may use the cache to generate and retransmit the same connect, query, and getData commands that were previously sent by the user application. However, because the user application has already received the data from the getData commands that were successfully completed before the connection was lost, the API wrapper may discard the data received from the data source when executing the first half of the getData commands. If the recreated request is successful, then the API wrapper can begin to send to the API and the data source the rest of the commands (e.g., the other half of the getData commands and the disconnect command) and forward the resulting data from these getData commands to the user application. For example, once the API wrapper returns the block of data from the last getData to occur before the failure, this may cause the user application to transmit the rest of the getData commands which are then fulfilled by the API.

In another example, assume the connection is severed during an insert where only half of the putData commands were executed. The API wrapper may generate and retransmit a new request that includes the commands that were sent successfully before the connection was lost (e.g., a connect command, insert command, and the first half of the putData commands) using the cached data. In some embodiments, the data sent to a data source may only be committed after all the putData commands have been executed. If the connection fails before the user application transmits a commit command, the data source may discard the data. Accordingly, when receiving the insert request, the API wrapper retransmits the cached data from the first half of the putData to the data source. Once the connection is reestablished, the API wrapper can transmit all the cached commands as well as the rest of the commands for the insert (e.g., the other half of the putData commands, a commit command, and a disconnect command). Because the API wrapper caches based on the particular commands in a usage pattern, the wrapper is able to use the cache to recreate the various types of usage patterns the user application may implement—e.g., a query, insert, delete, etc—which, as discussed above, may be advantageous compared to other options such as reconfiguring the user application or the API to perform this fault tolerant function.

At block 525, the API wrapper may attempt to complete the request by transmitting the recreated request formed at block 520. These new requests may be exactly the same as the old request that were issued by the user application and may be based on the usage patterns that were predefined by the user. That is, because the API wrapper knows the different usage patterns used by the user application, the wrapper can use cache data to recreate the request when the connection is lost. In one embodiment, once the state machine of the wrapper identifies that the entire request (i.e., usage pattern) was executed successfully, the wrapper may clean the cache.

In one embodiment, the API wrapper may use a timer to separate different attempts to complete the request. If the connection is still down, the wrapper may reset the timer and wait the predefined time before again transmitting the recreated request. The user may configure the wrapper to cap the request or use different delay intervals if the requests continue to fail. If after a certain number of tries the wrapper cannot complete the request, the wrapper may transmit a message to the user application which informs the user application of the problem. Without the wrapper, however, the request would have simply failed (or the user application may have hung up) without the user having any indication of why the connection failed. Because the user application may not be able to interpret the error codes that a particular API or data source may issue, the application cannot inform a user of the particular problem. In contrast, the API wrapper is configured to interpret the different error codes and may pass this information to a user via the user application who can then identify why the connection is lost and remedy the problem so the request can then be completed.

CONCLUSION

To make a connection between a user application and a data source fault tolerant, a user may use a wrapper generator to create an API wrapper that retries requests that may have failed due to a service disruption. The API wrapper may be an added layer between the user application and the API. To create the API wrapper, the wrapper generator may identify the different commands used by the user application to access the data source—e.g., query, store, search, alter, or delete data in the data source. That is, the wrapper generator identifies the commands used by the application when accessing a data source. The wrapper generator may retrieve the list from the user application or from the API which exposes the commands used by the user application. A user may then organize the commands to generate usage patterns for the different requests the user applications sends to the data source. For example, the user may define a usage pattern for querying the data source, inserting data into the data source, deleting data from the data source, and the like.

For one or more of the commands in a usage pattern, the user may also define a caching preference associated with the command. In one embodiment, the caching options enable the wrapper to create a new request if the original request fails. To restart the connection, the wrapper may access the cache and again attempt to complete the user request. Stated differently, the cache options provide a current context which describes the state of the connection between the user application and the data source. Moreover, the user may use the wrapper to select errors, which when received, instruct the wrapper to restart the connection based on the cached context. Once the wrapper generator receives from the user the various cache and error code options associated with the usage patterns, the generator may create the wrapper, which, when executed, creates a fault tolerant connection between the user application and the data source.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of generating a wrapper for an application program interface (API), the method comprising:
    receiving a usage pattern comprising a sequence of commands issued by a user application to access a data source;
    receiving a cache option associated with at least one command in the usage pattern, the cache option defining how the wrapper, to be generated, caches data when the user application issues the at least one command;
    receiving an error code associated with the at least one command, wherein the error code represents an error message issued by one of the API and the data source in response to a service disruption, wherein the wrapper is configured to retry a user application request upon identifying the error code; and
    generating the wrapper, by one or more computer processors, based on the received usage pattern, the received cache option, and the received error code.

2. The method of claim 1, further comprising:
    receiving a cache option for at least two commands in the usage pattern, wherein a respective cache option for one of the commands is different from a respective cache option for another one of the commands; and
    receiving an error code associated with at least two commands in the usage pattern, wherein a respective error code for one of the commands is different from a respective error code for another one of the commands.

3. The method of claim 1, wherein the wrapper is configured to, upon determining that a received error code matches the error code, retry the user application request based on the usage pattern and data cached using the cache option.

4. The method of claim 1, further comprising:
    accessing the user application or the API to retrieve a plurality of commands that the user application may issue when accessing the data source; and
    providing the plurality of commands to a user thereby permitting the user to determine the sequence of commands of the usage pattern from the provided plurality of commands.

5. The method of claim 1, wherein the usage pattern, the cache option, and the error code are received by a graphical user interface (GUI), the GUI displaying a plurality of commands, a plurality of cache options, and a plurality of error codes from which a user may select from to configure the wrapper.

6. The method of claim 1, wherein generating the wrapper further comprises generating a state machine based on a plurality of usage patterns, each usage pattern comprising a different sequence of commands.

7. The method of claim 1, wherein the wrapper, when executed, comprises a communication layer between the user application and the API such that the wrapper receives commands from the user application and forwards the received commands to the API and receives data request by the user application from the API and forwards the requested data to the user application.

* * * * *